United States Patent
Kurt et al.

(10) Patent No.: US 10,338,586 B2
(45) Date of Patent: Jul. 2, 2019

(54) METHOD FOR CONTROLLING AUTONOMOUS VALET SYSTEM PATHING FOR A MOTOR VEHICLE

(71) Applicants: Dura Operating, LLC, Auburn Hills, MI (US); Ohio State Innovation Foundation, Columbus, OH (US)

(72) Inventors: Arda Kurt, Dublin, OH (US); Keith Redmill, Columbus, OH (US); Umit Ozguner, Dublin, OH (US); Gordon Thomas, Beverly Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/242,175

(22) Filed: Aug. 19, 2016

(65) Prior Publication Data

US 2018/0052460 A1    Feb. 22, 2018

(51) Int. Cl.
*G01D 5/00* (2006.01)
*G01C 21/34* (2006.01)
(Continued)

(52) U.S. Cl.
CPC .......... *G05D 1/0088* (2013.01); *B60W 30/06* (2013.01); *B62D 15/0285* (2013.01); *G01C 21/3407* (2013.01); *G01C 21/3685* (2013.01); *G05D 1/0214* (2013.01); *G05D 1/0282* (2013.01); *G08G 1/143* (2013.01); *G08G 1/144* (2013.01); *G08G 1/146* (2013.01); *G08G 1/168* (2013.01); *G05D 2201/0213* (2013.01)

(58) Field of Classification Search
CPC .... G05D 1/0088; G05D 1/0214; G08G 1/146; G08G 1/168; G01C 21/3407

USPC .......................................................... 701/25
See application file for complete search history.

(56) References Cited

U.S. PATENT DOCUMENTS 7,844,377 B2   11/2010   Oota et al.
7,969,558 B2    6/2011   Hall
(Continued)

FOREIGN PATENT DOCUMENTS

DE   102009029117 A1 *   3/2011   ............ B60W 30/06
DE   102009029117 A1     3/2011
(Continued)

OTHER PUBLICATIONS

English Translation, Zimmermann, German Patent Publication DE 102009029117 A1, Mar. 2011, German Patent Office (Year: 2011).*
(Continued)

*Primary Examiner* — Nadeem Odeh
(74) *Attorney, Agent, or Firm* — Robert E. Ford; Raymond J. Vivacqua; Steven L. Crane

(57) ABSTRACT

A method for autonomously parking or un-parking a motor vehicle includes receiving a map of a parking area having a first temporary obstruction zone, determining a starting location of the motor vehicle relative to the parking area, selecting a destination location within the parking area, setting the first temporary obstruction zone as operative or inoperative, generating a path from the starting location to the destination location, wherein the path does not enter the first temporary obstruction zone when operative, and driving the motor vehicle autonomously along the path from the starting location of the motor vehicle to the destination location.

18 Claims, 4 Drawing Sheets

(51) Int. Cl.
*G05D 1/00* (2006.01)
*G05D 1/02* (2006.01)
*G08G 1/14* (2006.01)
*G08G 1/16* (2006.01)
*B62D 15/02* (2006.01)
*B60W 30/06* (2006.01)
*G01C 21/36* (2006.01)

(56) References Cited

U.S. PATENT DOCUMENTS

| | | | |
|---|---|---|---|
| 8,675,181 B2 | 3/2014 | Hall | |
| 8,767,190 B2 | 7/2014 | Hall | |
| 9,194,168 B1 | 11/2015 | Lu et al. | |
| 2006/0212216 A1 | 9/2006 | Kobayashi et al. | |
| 2010/0020306 A1 | 1/2010 | Hall | |
| 2011/0216304 A1 | 9/2011 | Hall | |
| 2013/0231824 A1 | 9/2013 | Wilson et al. | |
| 2015/0073645 A1 | 3/2015 | Davidsson et al. | |
| 2015/0353080 A1* | 12/2015 | Mukaiyama | E05B 77/54 701/23 |
| 2016/0125736 A1 | 5/2016 | Shaik | |
| 2016/0144857 A1* | 5/2016 | Ohshima | B60W 30/06 701/23 |
| 2016/0364985 A1* | 12/2016 | Penna | G08G 1/143 |
| 2017/0060133 A1* | 3/2017 | Seo | G05D 1/0088 |
| 2017/0197615 A1* | 7/2017 | Elie | B60W 10/20 |
| 2017/0254654 A1* | 9/2017 | Nordbruch | G01C 21/3415 |

FOREIGN PATENT DOCUMENTS

| | | | |
|---|---|---|---|
| DE | 102014221771 A1 * | 4/2016 | G01C 21/3407 |
| DE | 102015201204 A1 | 7/2016 | |
| EP | 1499522 B1 | 12/2009 | |
| WO | 2008032354 A1 | 3/2008 | |
| WO | 2016066355 A1 | 5/2016 | |

OTHER PUBLICATIONS

English Translation, Hoffmann, German Patent Publication DE 102014221771 A1, Apr. 2016, German Patent Office (Year: 2016).*

Christian Loeper et al., "Automated valted parking as part of an integrated travel assistance", Proceedings for the 16th International IEEE Annual Conference on Intelligent Transportation Systems (ITSC 2013), Oct. 6, 2013, pp. 2341-2348.

Marcos Gomes Prado, "Planejamento de trajetoria para esticionamento de veiculos automonos", Dissertation, Apr. 1, 2013, pp. 1-84

Maxim Likhachev et al., "Planning long dynamically feasible maneuvers for autommous vehicles", The International Journal of Robotics Research, Aug. 1, 2009, pp. 933-945.

* cited by examiner

METHOD FOR CONTROLLING AUTONOMOUS VALET SYSTEM PATHING FOR A MOTOR VEHICLE

FIELD

The invention relates generally to autonomous driver assistance systems for motor vehicles, and more particularly to a method of controlling a path of an autonomous driver assistance system for parking and un-parking or retrieving a motor vehicle.

BACKGROUND

The statements in this section merely provide background information related to the present disclosure and may or may not constitute prior art.

Smart car technologies such as free-ranging on grid navigation, as well as parking guidance and information systems, aid in the prevention of human error when drivers operate a vehicle. Such technologies have been used to improve navigation of roadways, and to augment the parking abilities of motor vehicle drivers while the drivers are present within the motor vehicle. For example, rear view camera systems and impact alert systems have been developed to assist the operator of the motor vehicle while parking to avoid collisions. In addition, autonomous parking systems have been developed that autonomously park the motor vehicle in a parallel parking spot once the operator of the motor vehicle has positioned the motor vehicle in a predefined location proximate the parking spot.

While these systems are useful for their intended purpose, they require that the operator of the motor vehicle locate the parking spot and drive to the parking spot. Thus, there is a need in the art for improved smart car technologies that utilize preexisting infrastructure to autonomously park a motor vehicle. Moreover, there is a need to implement automatic parking systems in motor vehicles that do not increase cost, and which also increase the accuracy and robustness of parking systems while providing additional redundant ease of access and safety features.

SUMMARY

A method for autonomously parking or un-parking a motor vehicle is provided. The method includes receiving a map of a parking area having a first temporary obstruction zone, determining a starting location of the motor vehicle relative to the parking area, selecting a destination location within the parking area, setting the first temporary obstruction zone as operative or inoperative, generating a path from the starting location to the destination location, wherein the path does not enter the first temporary obstruction zone when operative, and driving the motor vehicle autonomously along the path from the starting location of the motor vehicle to the destination location.

In one aspect, first temporary obstruction zone is a lane in the parking area that is to be avoided in certain stages of operation.

In another aspect, the first temporary obstruction zone is a portion of the parking area that covers one or more parking spots in the parking area.

In another aspect, the first temporary obstruction zone when operative defines a more preferred route from the starting location to the destination location along which the path planner is generated.

In another aspect, the parking area includes a right side lane and a left side lane along a route from the starting location to the destination location, and the first temporary obstruction zone covers the right side lane and the first temporary obstruction zone is set as inoperative.

In another aspect, the parking area includes a right side lane and a left side lane along a route from the starting location to the destination location, and the first temporary obstruction zone covers the left side lane and the first temporary obstruction zone is set as operative.

In another aspect, the first temporary obstruction zone is operative to prevent the path from generating on a left hand side of a route and inoperative to allow the path to generate on a right hand side of a route.

In another aspect, the first temporary obstruction zone is operative or inoperative based on the preferences on the generated path and the current stage of operation.

In another aspect, the destination location is an open parking spot in the parking area.

In another aspect, the destination location is a location of a mobile device in communication with the motor vehicle.

In another aspect, the first temporary obstruction zone covers a parking spot, and the method includes setting the first temporary obstruction zone operative if the parking spot is full and inoperative if the parking spot is empty.

In another aspect, the map includes a permanent obstruction zone that is always operative, wherein the path does not enter the permanent obstruction zone.

In another aspect, the permanent obstruction zone covers a fixed object located in the parking area.

In another example, a method for autonomously parking or un-parking a motor vehicle includes initiating a park function, receiving a map of a parking area, the map having a plurality of parking spots, a first temporary obstruction zone and a second temporary obstruction zone, wherein the first and second temporary obstruction zones are flagged as either operative or inoperative, determining a starting location of the motor vehicle relative to the parking area, selecting a parking spot within the parking area, flagging the first temporary obstruction zone as operative and the second temporary obstruction zone as inoperative, generating a path from the starting location to the parking spot wherein the path does not enter either the first or second temporary obstruction zones when operative, and driving the motor vehicle autonomously along the path from the starting location of the motor vehicle to the parking spot.

In one aspect, the method further includes initiating an un-park function, selecting a destination location, flagging the first temporary obstruction zone as inoperative and the second temporary obstruction zone as operative, generating a path from the parking spot to the destination location wherein the path does not enter either the first or second temporary obstruction zones when operative, and driving the motor vehicle autonomously along the path from the parking spot to the destination location.

In another example, an automatic valet method includes receiving a map of a parking area having a plurality of obstruction zones that can be flagged as either operative or inoperative, determining a starting location of the motor vehicle relative to the parking area, determining a parking spot within the parking area, determining a pick-up location relative to the parking area, generating a path from the starting location to the parking spot to the pick-up location, wherein the path includes an approach phase, a parking phase, an un-parking phase, and a return phase, and wherein the path does not generate within an operative obstruction zone, and wherein an obstruction zone is flagged as either operative or inoperative based on whether the path is in the approach phase, the parking phase, the un-parking phase, and the return phase, and driving the motor vehicle autonomously along the path.

In one aspect, the plurality of obstruction zones include left and right side lanes in the parking area.

In another aspect, the plurality of obstruction zones include portions of the parking area that covers one or more parking spots in the parking area.

In another aspect, the plurality of obstruction zones when operative define a route in the approach phase and the return phase between.

In another aspect, the approach phase is a portion of the path from the starting location to the parking spot and the return phase is a portion of the path from the parking spot to the pick-up location.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application or uses.

Figure 1:
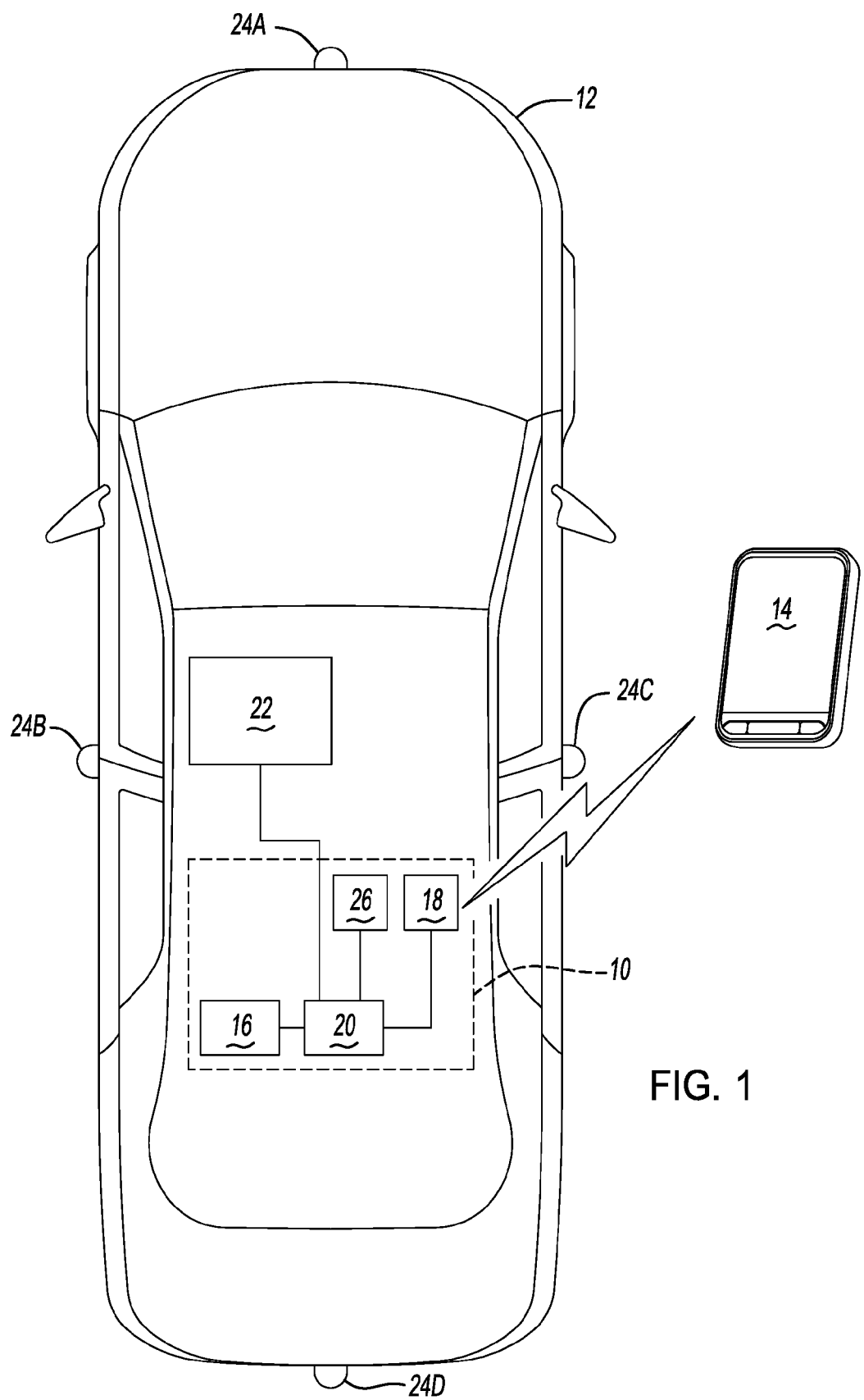
FIG. 1 is a schematic diagram of an exemplary motor vehicle having an automatic valet system according to the principles of the present disclosure.

With reference to FIG. 1, an autonomous valet system according to the principles of the present disclosure is indicated by reference number 10. The autonomous valet system 10 is used with an exemplary motor vehicle 12 and an exemplary mobile device 14. The motor vehicle 12 is illustrated as a passenger vehicle, however, the motor vehicle 12 may be a truck, sport utility vehicle, van, motor home, or any other type of vehicle without departing from the scope of the present disclosure. The mobile device 14 is preferably a mobile phone, however, the mobile device 14 may be a mobile computer, laptop, tablet, smart watch, or any other device in wireless communication with the motor vehicle 12. The autonomous valet system 10 runs an autonomous valet method or application, as will be described in greater detail below.

The autonomous valet system 10 is operable to autonomously park and un-park the motor vehicle 12. The autonomous valet system 10 may have various configurations without departing from the scope of the present disclosure but generally includes a sensor sub-system 16 and a communication sub-system 18 each in communication with a controller 20. The controller 20 communicates with a vehicle control system 22. The sensor sub-system 16 includes a plurality of sensors 24A-D mounted along the periphery of the motor vehicle 12. In the example provided, the sensors 24A-D are located at the front, left, right, and rear of the motor vehicle 12, respectively, to provide 360 degrees of overlapping coverage. However, it should be appreciated that the sensor sub-system 16 may have any number of sensors 24 without departing from the scope of the disclosure. Each of the sensors 24A-D is operable to collect or sense information in a predefined area surrounding the motor vehicle 12. Information from the sensors 24A-D is communicated to the controller 20. In a preferred embodiment, the sensors 24A-D are Light Detection and Ranging (LiDAR) sensors. However, the sensors 24A-D may be cameras, radar or sonar sensors, or any other type of proximity sensors. The communication sub-system 18 includes a receiver/transmitter operable to receive and/or transmit wireless data to the mobile device 14. The wireless data is communicated to the controller 20. In addition, the communication sub-system 18 may communicate with other vehicles (vehicle-to-vehicle communication), infrastructure such as a parking lot (vehicle-to-infrastructure), and may receive GPS data.

The controller 20 is a non-generalized, electronic control device having a preprogrammed digital computer or processor, memory or non-transitory computer readable medium used to store data such as control logic, instructions, image data, lookup tables, etc., and a plurality of input/output peripherals or ports. The processor is configured to execute the control logic or instructions. The controller 20 may have additional processors or additional integrated circuits in communication with the processor, such as perception logic circuits for analyzing the sensor data.

The controller 20 may optionally communicate with a human machine interface (HMI) 26. The HMI 26 is disposed within the cabin of the motor vehicle 12 and is preferably a touch screen accessible by an operator of the motor vehicle 12. However, the HMI 26 may be any haptic, verbal, or gesture control system without departing from the scope of the present disclosure. The HMI 26 may be used to activate and control the autonomous valet system 10. Additionally, the mobile device 14 may be used to activate and control the autonomous valet system 10.

The vehicle control system 22 includes any systems that implement the autonomous valet functions which include parking and un-parking the motor vehicle 12. For example, the vehicle control system 22 may include a braking control system, throttle control system, steering control system, body control system, etc. The vehicle control system 22 may also include any advanced driver assistance system (ADAS) functions that automate, adapt, or enhance vehicle systems in order to increase vehicle safety and/or operator driving performance. For example, the vehicle control system 22 may include ADAS technologies that alert the driver to potential problems or to avoid collisions by implementing safeguards, such as autonomously controlling the motor vehicle 12. The vehicle control system 22 may also include ADAS features that enhance certain systems, such as automated lighting, adaptive cruise control, automated braking, or improved blind spot elimination using camera technology. Finally, it should be appreciated that the vehicle control system 22 may be part of the autonomous valet system 10 without departing from the scope of the present disclosure.

Figure 2A:
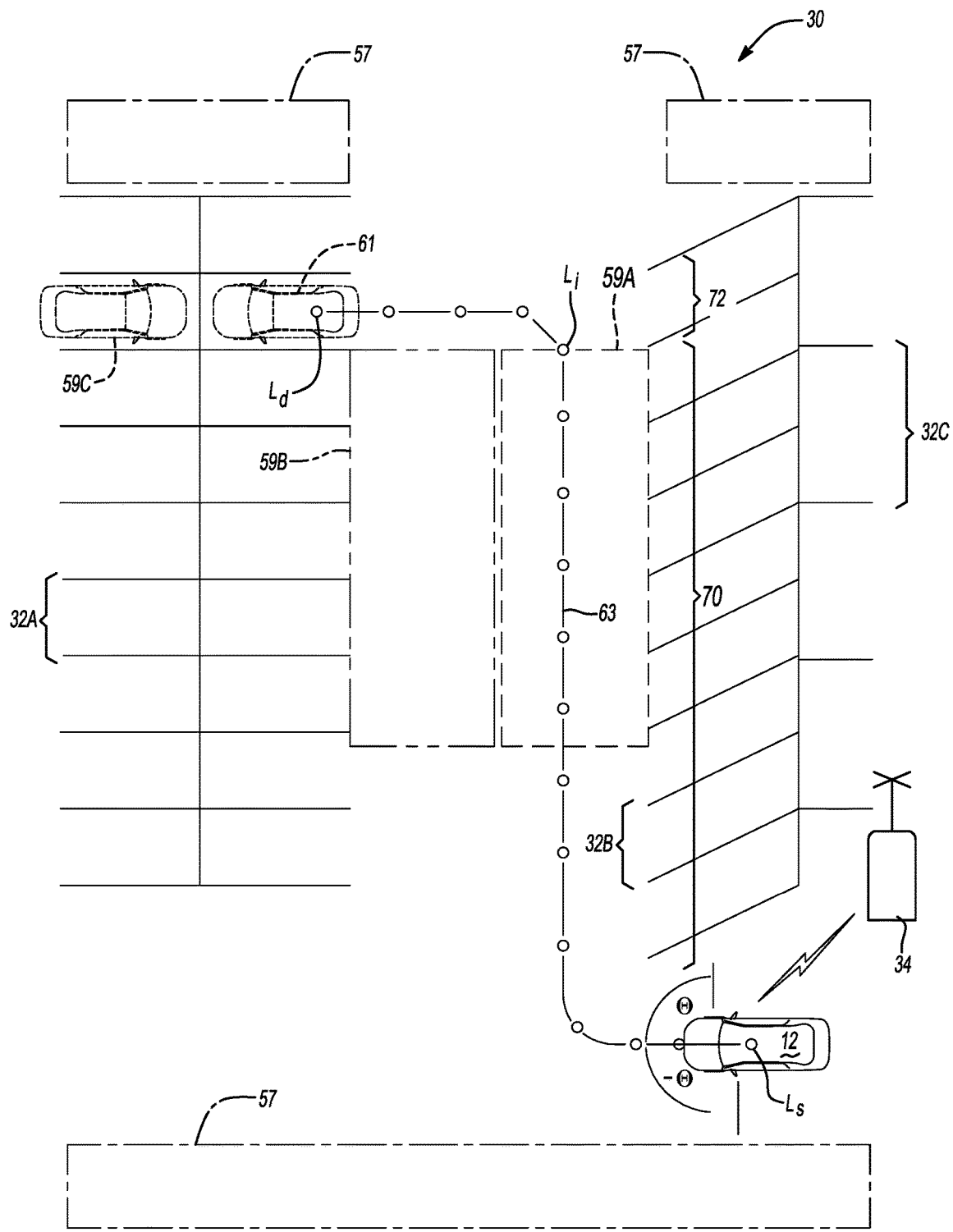
FIG. 2A is a schematic diagram of an exemplary parking area showing a park function.
Figure 2B:
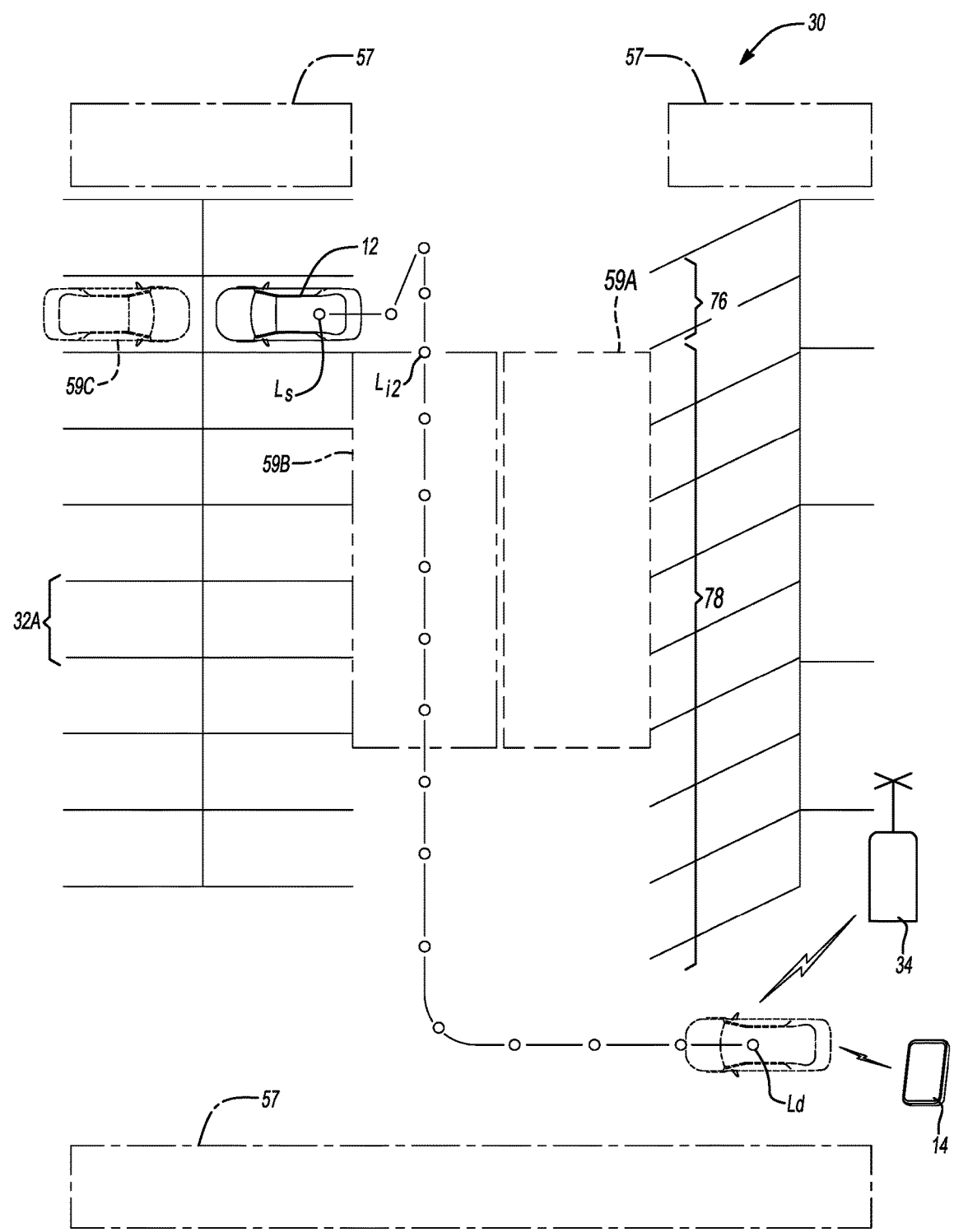
FIG. 2B is a schematic diagram of an exemplary parking area showing an un-park function.

Turning to FIGS. 2A and 2B, an exemplary parking area is indicated by reference number 30. The parking area 30 includes a plurality of parking spots including, in the example provided, perpendicular parking spots 32A, angled parking spots 32B, and parallel parking spots 32C. It should be appreciated that the parking area 30 may have any configuration, may be a parking structure, and may have any number and type of parking spots 32 without departing from the scope of the present disclosure. The parking area 30 includes a parking area infrastructure 34 that may communicate with the motor vehicle 12.

Figure 3:
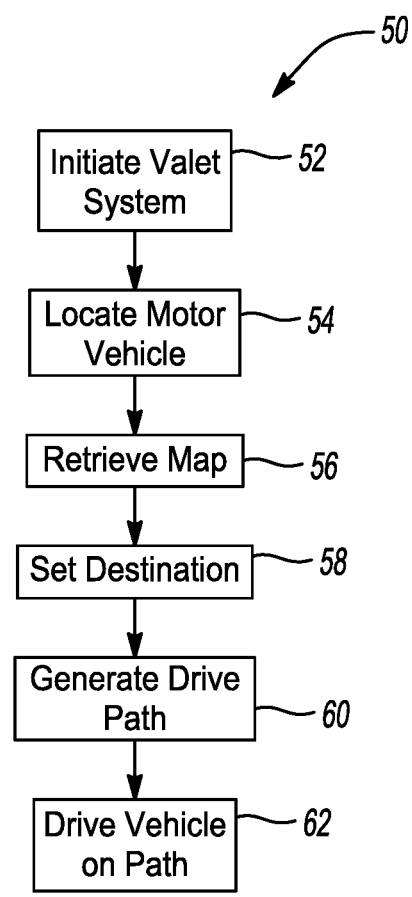
FIG. 3 is a flow chart depicting a method for autonomously parking and un-parking the motor vehicle according to the principles of the present disclosure.

With reference to FIG. 3, and continued reference to FIGS. 1, 2A, and 2B, a method for autonomously parking and un-parking the motor vehicle 12 in the parking area 30 is indicated by reference number 50. By way of example, the method 50 illustrates parking the motor vehicle 12 within the parking area 30. However, it should be appreciated that the method 50 may be used identically when un-parking or retrieving the motor vehicle 12 from the parking area 30. The method 50 begins at step 52 where an operator of the motor vehicle 12 initiates or activates the autonomous valet system 10 using either the HMI 26 or the mobile device 14. For example, when parking, the operator may use the HMI 26 while during un-parking the operator may use the mobile device 14.

At step 54, the motor vehicle 12 is located within, or relative to, the parking area 30. The motor vehicle 12 may be located in the parking area 30 by positioning the motor vehicle 12 in a predefined starting location or parking spot or by GPS coordinates. At step 56 the motor vehicle 12 communicates with the parking area infrastructure to receive a map of the parking area 30. The map may be defined as a Cartesian coordinate system with x and y coordinates. The motor vehicle 12 is located on the map using (x, y, $\Theta$) coordinates, where $\Theta$ is a steering angle or a heading of the motor vehicle 12. The map of the parking area 30 includes a plurality of permanent obstruction zones 57 and a plurality of temporary or virtual obstruction zones 59. The permanent obstruction zones 57 cover areas that have fixed objects, for example lamp posts, curbs, buildings, and edge boundaries. The temporary obstruction zones 59 cover those areas where it may be desirable, based on certain factors, to prevent the motor vehicle 12 from traveling. The temporary obstruction zones 59 may be used to designate parked vehicles or parking spaces, lanes along a route, areas of the parking area 30 that are temporarily off-limits, etc. In the example provided, the temporary obstruction zones 59 include a first temporary obstruction zone 59A that covers a lane of a route, a second temporary obstruction zone 59B that covers another lane of the route, and a parked car 59C. The temporary obstruction zones 59 may be flagged as operative or inoperative by the parking area infrastructure 34 or by the autonomous valet system 10, as will be described below.

At step 58, a destination is set in the parking area 30. In the example provided, the destination is a parking spot indicated by reference number 61 in FIG. 2A. The destination may be selected by an operator of the motor vehicle 12 or may be assigned by the parking area infrastructure 34 based on open or available parking spots 32. Alternatively, in an un-park mode, the destination location may be the location of the mobile device 14, as shown in FIG. 2B. It should be appreciated that steps 54-58 may be done in various orders or simultaneously without departing from the scope of the present disclosure.

Next, at step 60, a node tree path planner is generated from the location of the motor vehicle 12 to the destination location 61. From the node tree path planner a lowest cost path is selected, as shown by reference number 63 in FIG. 2. The lowest cost path 63 operates as a path for the motor vehicle 12 to take from the starting location to the destination location 61. Finally, at step 62, the autonomous valet system 10 drives the mover vehicle along the lowest cost path 61 using the vehicle control system 22. The sensor sub-system 16 may be used during autonomous driving to avoid obstacles not located in the predefined parking area map, such as pedestrians, other vehicles, etc.

Figure 4:
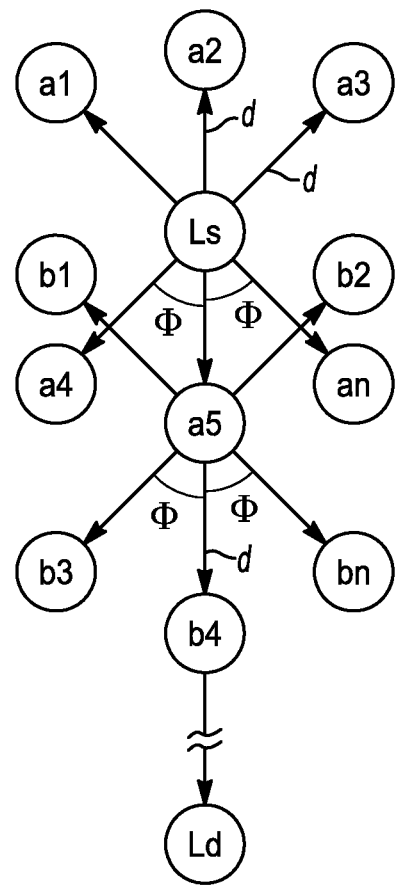
FIG. 4 is an example of a node tree used in the method for autonomously parking and un-parking the motor vehicle.

Turning now to FIG. 4, the method of generating the node tree path planner will now be described in greater detail. The node tree path planner begins by generating a first set of nodes $a_1$, $a_2$, $a_3$, $a_4$, $a_5$ ... $a_n$ from the starting location $L_s$ of the motor vehicle 12. Each node is generated a distance 'd' from the starting location $L_s$ at a predefined turn angle $\phi$. It should be appreciated that any number of nodes may be generated however, in a preferred embodiment, nine forward nodes are generated and nine reverse nodes are generated. The distance d may have various values but is preferably approximately 2 meters. The turn angle $\phi$ may also have various values but preferably equally divides the nodes from straight ahead to a full right turn and a full left turn. Each of the nodes is defined by (x, y, $\Theta$) coordinates.

Next, any nodes that are blocked by the parking area map are removed or not generated. For example, each permanent obstruction zone 57 and temporary obstruction zone 59 is defined as a quadrilateral centered on an x, y coordinate. At each newly generated node, the method determines if the motor vehicle 12 would overlap the obstruction zone 57, 59. Various methods may be used to determine the overlap, including a Point in Polygon (PIP) check. A safety factor may be used in the overlap determination. If the motor vehicle 12 at a node would overlap a permanent obstruction zone 57 the node would not be generated. If the motor vehicle 12 at a node would overlap an operative temporary obstruction zone 59 the node would not be generated. However, if the motor vehicle 12 at a node would overlap an inoperative temporary obstruction zone 59, the node would be generated.

Once the first set of nodes are generated, the node tree path planner assigns a cost to each of the nodes. The cost for each node in the first set is equal to a base cost plus a turning cost. The base cost is a function of the distance from the node to the destination location $L_d$. Thus, the closer the node is to the destination location $L_d$, the lower the base cost. The turning cost increases with an increase in the steering angle $\Theta$. In other words, the larger the turn required to reach the node, the greater the cost. If the node is a reverse node that would require the motor vehicle to change gears, an additional reverse cost is added to the node.

Once the nodes have been assigned a cost, the node tree path planner selects the lowest cost node, such as node $a_5$ in the example provided, and generates another set of nodes $b_1$, $b_2$, $b_3$, $b_4$ ... $b_n$ from the selected lowest cost node. Each of the nodes are generated at a distance d from the node $a_5$ at turn angles $\phi$. Any nodes located in areas designated as permanent obstruction zones 57 or operative temporary obstruction zones 59 are not generated, as described above. Moreover, any nodes previously generated are not generated again. Next, costs are assigned to each node $b_1$, $b_2$, $b_3$, $b_4$ ... $b_n$ as described above except that the base cost also includes the cost of node $a_5$. Thus, each child node inherits the cost of the parent node from which it is generated. In one embodiment, the base cost also includes a generation cost which is a function of which generation the node is from the starting location node. For example, a generation cost may be added after between 20 or 30 generations in order to discourage further generations. In another embodiment, the cost of a child node is compared to a fixed or variable threshold value. If the cost of the child node exceeds the threshold value, the node is not generated or no further child nodes are generated from the node. The tree node path planner then selects the lowest cost node from all of the nodes generated thus far and repeats the method until a newly generated node is at the destination location $L_d$.

Once a node is at the location $L_d$, the node tree path planner traces the path back to the starting location Ls and sets the path 63. The motor vehicle 12 may be driven from node to node along the path or may be driven along an average or weighted curve along the path.

The temporary obstruction zones 59 may be used to influence the path 63 generated by the path planner by selectively flagging which zones are operative or inoperative. For example, FIG. 2A illustrates the motor vehicle 12 during a park function. During the park function, the path 63 includes an approach phase, indicated by reference number 70, and a parking phase, indicated by reference number 72. An intermediate node or location, $L_i$, separates the approach phase 70 from the parking phase 72. In a preferred embodiment, $L_i$ is set a predefined distance away from the destination location $L_d$, i.e., the parking spot. The approach phase 70 is defined by nodes generated between the location $L_s$ of the motor vehicle 12 and the intermediate location $L_i$. The parking phase 72 is defined by nodes generated between the intermediate location $L_i$ and the destination location $L_d$. In order to encourage the path 63 to keep to the right hand side of the lane, the first temporary obstruction zone 59A is flagged as inoperative while the second temporary obstruction zone 59B is flagged as operative during the approach phase. Thus, the path 63 will generate on the right hand side. During the parking phase 72, both zones 59A, 59B are flagged as inoperative.

FIG. 2B illustrates the motor vehicle 12 during an un-park or retrieve function. During the un-park function, the path 63 includes an un-park phase, indicated by reference number 76, and a return phase, indicated by reference number 78. An intermediate node or location, $L_{i2}$, separates the un-park phase 76 from the return phase 78. In a preferred embodiment, $L_{i2}$ is set a predefined distance away from the destination location $L_d$, i.e., the parking spot. The un-park phase 76 is defined by nodes generated between the location $L_s$ of the motor vehicle 12 and the intermediate location $L_{i2}$. The return phase 78 is defined by nodes generated between the intermediate location $L_{i2}$ and the destination location $L_d$. In order to encourage the path 63 to keep to the right hand side of the lane, the second temporary obstruction zone 59B is flagged as inoperative while the first temporary obstruction zone 59A is flagged as operative during the return phase 78. Thus, the path 63 will generate on the right hand side. During the un-park phase 76, both zones 59A, 59B are flagged as inoperative.

The temporary obstruction zones 59 may be constructed to define paths for the approach or return phases 72, 78 in the center of the lane, or even across open parking spots. In one embodiment, the cost of a generated node may be increased if the node is generated in a temporary obstruction zone 59 rather than not generating the node. Pre-defining paths or increasing node costs essentially reduce the number of nodes generated by the path planner and may reduce processing time.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for autonomously driving a motor vehicle, the method comprising:
   receiving a map having a first temporary obstruction zone;
   determining a starting location of the motor vehicle on the map;
   selecting a destination location within the map, wherein the first temporary obstruction zone is located between the starting location and the destination location;
   setting the first temporary obstruction zone as operative or inoperative, wherein the first temporary obstruction zone does not contain an object;
   generating a path from the starting location to the destination location, wherein generating the path comprises the steps of:
   (a) generating a first set of nodes from the starting location of the motor vehicle;
   (b) assigning a cost to each node of the first set of nodes;
   (c) selecting a lowest cost node from the first set of nodes;
   (d) generating another set of nodes from the selected node;
   (e) assigning a cost to each of the newly generated nodes, wherein the cost is equal to an inherited cost plus a base cost and a change cost, wherein the change cost is a function of a previously generated node;
   (f) selecting a lowest cost node from all of the nodes;
   (g) repeating steps (d)-(f) until a lowest cost node is located at the destination location; and
   (h) setting a path from the starting location of the motor vehicle to the destination location comprising the last selected lowest cost node and parent nodes connected to the last selected lowest cost node,
   wherein nodes are not generated in the first temporary obstruction zone when set as operative and nodes are generated in the first temporary obstruction zone when set as inoperative; and
   driving the motor vehicle autonomously along the path from the starting location of the motor vehicle to the destination location.

2. The method of claim 1 wherein the first temporary obstruction zone is a lane in the map.

3. The method of claim 1 wherein the map includes a right side lane and a left side lane along a route from the starting location to the destination location, and the first temporary obstruction zone covers the right side lane and the first temporary obstruction zone is set as inoperative.

4. The method of claim 1 wherein the map includes a right side lane and a left side lane along a route from the starting location to the destination location, and the first temporary obstruction zone covers the left side lane and the first temporary obstruction zone is set as operative.

5. The method of claim 1,
   wherein the map includes a second temporary obstruction zone adjacent the first temporary obstruction zone,
   wherein the first temporary obstruction zone is operative to prevent the path from generating on a left hand side of a route from the starting location to the destination location, and
   wherein the second temporary obstruction zone is inoperative to allow the path to generate on a right hand side of the route.

6. The method of claim 1 wherein the destination location is an open parking spot in a parking area.

7. The method of claim 1 wherein the destination location is a location of a mobile device in communication with the motor vehicle.

8. The method of claim 1 further comprising generating a permanent obstruction zone on the map that is always operative, wherein the path does not enter the permanent obstruction zone.

9. The method of claim 8 wherein the permanent obstruction zone covers a fixed object located in the map.

10. The method of claim 1, wherein the step of receiving the map having the first temporary obstruction zone includes receiving the map from a parking area infrastructure.

11. The method of claim 10, wherein the step of setting the first temporary obstruction zone as operative or inoperative is performed by the parking area infrastructure.

12. The method of claim 1, wherein the destination is set by an operator of the motor vehicle or by the parking area infrastructure.

13. A method for autonomously valet parking a motor vehicle, the method comprising:
   initiating a park function;
   receiving a map of a parking area from a parking area infrastructure, the map having a plurality of parking spots, a first temporary obstruction zone and a second temporary obstruction zone, wherein the first and second temporary obstruction zones are in lanes, do not contain an object and are each selectively flagged as operative or inoperative by the parking area infrastructure;
   determining a starting location of the motor vehicle relative to the parking area;
   selecting a parking spot within the parking area;
   generating a path from the starting location to the parking spot wherein the path does not enter the first or second temporary obstruction zones when operative, wherein generating the path comprises the steps of:
   (a) generating a first set of nodes from the starting location of the motor vehicle;
   (b) assigning a cost to each node of the first set of nodes;
   (c) selecting a lowest cost node from the first set of nodes;
   (d) generating another set of nodes from the selected node;
   (e) assigning a cost to each of the newly generated nodes, wherein the cost is equal to an inherited cost plus a base cost and a change cost, wherein the change cost is a function of a previously generated node;
   (f) selecting a lowest cost node from all of the nodes;
   (g) repeating steps (d)-(f) until a lowest cost node is located at the parking spot; and
   (h) setting a path from the starting location of the motor vehicle to the parking spot comprising the last selected lowest cost node and parent nodes connected to the last selected lowest cost node, wherein nodes are not generated in the first temporary obstruction zone when operative and nodes are not generated in the second temporary obstruction zone when operative; and
   driving the motor vehicle autonomously along the path from the starting location of the motor vehicle to the parking spot.

14. The method of claim 13 further comprising:
   initiating an un-park function;
   selecting a destination location;
   generating a path from the parking spot to the destination location wherein the path does not enter either the first or second temporary obstruction zones when operative; and
   driving the motor vehicle autonomously along the path from the parking spot to the destination location.

15. An automatic valet method comprising:
   receiving a map of a parking area having a plurality of temporary obstruction zones that can be selectively flagged as either operative or inoperative by a parking area infrastructure, wherein the plurality of temporary obstruction zones do not contain an object;
   determining a starting location of a motor vehicle relative to the parking area;
   determining a parking spot within the parking area;
   determining a pick-up location relative to the parking area;
   generating a first path from the starting location to the parking spot;
   generating a second path from the parking spot to the pick-up location, wherein the first path includes an approach phase and a parking phase, wherein the second path includes an un-parking phase and a return phase, and wherein the approach phase, parking phase, un-parking phase, and return phase are not generated within a temporary obstruction zone when flagged as operative,
   wherein generating the first path comprises the steps of:
   (a) generating a first set of nodes from the starting location;
   (b) assigning a cost to each node of the first set of nodes;
   (c) selecting a lowest cost node from the first set of nodes;
   (d) generating another set of nodes from the selected node;
   (e) assigning a cost to each of the newly generated nodes, wherein the cost is equal to an inherited cost plus a base cost and a change cost, wherein the change cost is a function of a previously generated node;
   (f) selecting a lowest cost node from all of the nodes;
   (g) repeating steps (d)-(f) until a lowest cost node is located at the parking spot; and
   (h) setting the first path comprising the last selected lowest cost node and parent nodes connected to the last selected lowest cost node,
   wherein nodes are not generated in the first temporary obstruction zone when operative and nodes are generated in the first temporary obstruction zone when inoperative; and
   wherein generating the second path comprises the steps of:
   (a) generating a second set of nodes from the parking spot;
   (b) assigning a cost to each node of the second set of nodes;
   (c) selecting a lowest cost node from the second set of nodes;
   (d) generating another set of nodes from the selected node;
   (e) assigning a cost to each of the newly generated nodes, wherein the cost is equal to an inherited cost plus a base cost and a change cost, wherein the change cost is a function of a previously generated node;
   (f) selecting a lowest cost node from all of the nodes;
   (g) repeating steps (d)-(f) until a lowest cost node is located at the pick-up location; and
   (h) setting the second path comprising the last selected lowest cost node and parent nodes connected to the last selected lowest cost node,
   wherein nodes are not generated in the first temporary obstruction zone when operative and nodes are generated in the first temporary obstruction zone when inoperative; and
   driving the motor vehicle autonomously along the first path and the second path.

16. The method of claim 15 wherein the plurality of temporary obstruction zones include left and right side lanes in the parking area.

17. The method of claim 15 wherein the plurality of temporary obstruction zones include portions of the parking area that covers one or more parking spots in the parking area.

18. The method of claim 15 wherein the plurality of temporary obstruction zones when operative define a route in the approach phase and the return phase.

* * * * *